US006895446B2

(12) United States Patent
Luzzatto

(10) Patent No.: US 6,895,446 B2
(45) Date of Patent: May 17, 2005

(54) APPARATUS FOR CONTROLLING COMPUTER POINTER MOTIONS, OUTPUTS AND EVENTS

(76) Inventor: Marco Luzzatto, 33 Bezalel Street, 64683, Tel Aviv (IL)

( * ) Notice: Subject to any disclaimer, the term of this patent is extended or adjusted under 35 U.S.C. 154(b) by 82 days.

(21) Appl. No.: 10/356,703

(22) Filed: Jan. 31, 2003

(65) Prior Publication Data

US 2003/0224727 A1 Dec. 4, 2003

Related U.S. Application Data

(63) Continuation of application No. PCT/IL01/00718, filed on Aug. 2, 2001.

(30) Foreign Application Priority Data

Aug. 3, 2000 (IL) ................................. 137690

(51) Int. Cl.⁷ ............................................. G06F 13/00
(52) U.S. Cl. ............................... 710/5; 710/12; 710/20; 710/52; 345/156; 345/157
(58) Field of Search ............................... 710/5, 12, 20, 710/52; 345/156, 157

(56) References Cited

U.S. PATENT DOCUMENTS

| 6,011,541 A | * | 1/2000 | Klein ........................ 345/156 |
| 6,031,521 A | | 2/2000 | Luzzato |
| 6,336,149 B1 | * | 1/2002 | Preston ........................ 710/1 |

FOREIGN PATENT DOCUMENTS

| WO | WO 97/08603 | 3/1997 |
| WO | WO 98/36404 | 8/1998 |

* cited by examiner

*Primary Examiner*—A. Elamin
(74) *Attorney, Agent, or Firm*—Martin Fleit; Paul D. Bianco; Fleit Kain Gibbons Gutman Bongini & Bianco P.L.

(57) ABSTRACT

Secondary pointer for the control of computers, which comprises a transceiver coupled with a decoder/encoder, at least one memory or memory address, an embedded controller, and hand-operable actuation means, such as keys or buttons, for placing the device in the receiving or transmitting mode. The pointer may also include a selector which attributes an identification to each command or program in the receiving mode, and uses the identification to retrieve the program which the operator desires when the device is placed in the transmitting mode.

18 Claims, 3 Drawing Sheets

APPARATUS FOR CONTROLLING COMPUTER POINTER MOTIONS, OUTPUTS AND EVENTS

RELATED APPLICATION

This application is a continuation of earlier filed International Application PCT/IL01/00718 filed Aug. 2, 2001 designating the United States of America, the entire content of which is expressly incorporated herein by reference thereto.

BACKGROUND OF THE INVENTION

1. Field of the Invention

This invention relates to a new and improved device for causing a computer to repeat operations determined by a computer pointer device, whereby to repeat desired operations by a reduced number of commands or by a single command, without interfering with the computer software or hardware or with the computer pointer device structure and operation. In particular, it refers to an apparatus, independent of the pointer device and of the computer and operable with conventional pointer devices and computers, for causing the computer to repeat operations originally defined by the pointer device.

2. Prior Art

PCT Application WO 97/08603, corresponding to U.S. Pat. No. 6,431,521, the contents of which are entirely incorporated herein by reference, describes and claims a method of operating a computer which comprises the steps of:

A—Choosing one of two modes, the R/M (REGISTER/MEMORY) mode or the A/P (ACTIVE/PLAY) mode;

B—When the pointer is in the R/M mode: a) selecting at least an operation unit, as hereinbefore defined, by bringing the pointer index to a reference point corresponding to said operation unit; and b) causing the pointer index coordinate displacements relative to said reference position and a first, selected base point to be counted and registered or memorized as differential coordinate displacements;

C—When the pointer is in the A/P mode: a) selecting an operation unit from among those previously selected in the R/M mode; b) determining the corresponding counter coordinates, as hereinbefore defined, of the reference position by applying the differential coordinate displacements with the appropriate sign, to the counter coordinates of a second base point; and c) carrying out the operation unit corresponding to said reference counter coordinates.

PCT Application WO 98/36404, the contents of which are entirely incorporated herein by reference, claims a process for recording and reproducing computer pointer outputs and/or events which comprises the steps of:

A—Choosing one of two Modes, the R/M (REGISTER/MEMORY) Mode or the A/P (ACTIVE/PLAY) Mode;

B—When the pointer is in the R/M mode: a) identifying the beginning of a pointer output; b) registering all the pointer events occurring thereafter; c) identifying the end of the pointer output; and d) ceasing to register any successive pointer events;

C—When the pointer is in the A/P Mode, causing the events comprised in the selected pointer output to be repeated.

In both of said references, the computer pointer, typically a mouse: a) sends to the computer, which it operates, certain information, which comprises displacements of the pointer index in the X and Y axis direction and selection of operations defined by specific positions of said index on the computer screen, and later on, b) by means of a single command or a limited series of commands, the same information is entered into the computer as deriving from the pointer, whereby the computer carries out, once again, the same operations that were originally defined by the aforesaid displacements and selection.

The actions carried out by the pointer and the information sent out by it can be generally called "pointer events" and/or "pointer outputs"

As described in U.S. Pat. No. 6,031,521, the method of said patent can be carried out by an apparatus which comprises a pointer device and a computer, said pointer device transmitting, as usual, to the computer signals corresponding to the pointer index displacements and other desired information and instructions, and the computer having means for receiving and processing said signals to cause corresponding pointer index displacements and other operations directed by said signals to be performed. Further, the apparatus comprises means for identifying of all the signals transmitted by the computer those corresponding to differential displacements, counter means for registering the differential displacements, means for reading and/or receiving the differential displacements and determining from them the reference counter coordinates, and means for performing the operations corresponding to said reference counter coordinates. These last-mentioned means can be included in a synchronous interface or a circuit capable of performing the functions of a conventional synchronous interface. The synchronous interface can be embodied in a card or in more cards in series, that can be inserted into the computer. Alternatively, the computer pointer itself can comprise the means for identifying the differential displacements registering them, retrieving them and transmitting the retrieved displacements to the computer. The same apparatus permits to carry out the method of WO 98/36404.

SUMMARY OF THE INVENTION

It would be desirable to perform the aforesaid methods by means that are entirely separate both from the pointer device and from the computer and, further, are in no way mechanically connected to either of them.

It is therefore a purpose of this invention to provide an apparatus that provides and/or includes such means.

It is another purpose of the invention to provide such an apparatus that is small and inexpensive.

It is a further purpose of this invention to provide such an apparatus that is easy to operate.

It is a still further purpose of the invention to provide such an apparatus that is composed of components that are easily available on the market and which can be easily combined by skilled persons.

Other purposes and advantages of the invention will appear as the description proceeds.

This invention is applicable to pointer devices which are connected to the computer not by cable or by other physical means, but send their information by means of radiation, and to computer that are provided with means for receiving and processing said information. Pointers operating by emitting infrared radiation have been known for some time. It is believed that pointer devices operating by the emission of short-range radio waves, known in the art as "Bluetooth", will soon be available and be widely used, in view of the operating and cost advantages they offer. This invention is particularly, but not exclusively, intended for application by means of such Bluetooth devices. Further, the invention will be described with reference to a pointer device known as "mouse", although it is not confined to such pointers, but is applicable to any pointer which sends information to the computer by means of radiation. Information sent by means of radiation is, of course, analog information, and the computer must be provided with means for decoding said analog information and deriving from it the digital information that is required for its operation. All these means are well known in the art.

This being said, the invention provides an independent device that will be called herein, for simplicity's sake, "secondary pointer", and which has a receiving and a transmitting mode. The receiving mode corresponds to the R/M mode of the aforesaid WO 97/08603, U.S. Pat. No. 6,431,521, and WO 98/36404 and will be briefly indicated as "R mode". The transmitting mode corresponds to the A/P mode of the aforesaid WO 97/08603, U.S. Pat. No. 6,431, 521, and WO 98/36404 and will be briefly indicated as "T mode". In the receiving mode, the secondary pointer receives the same information from the pointer that the computer receives, and registers it. In the transmitting mode, the secondary pointer transmits the same information to the computer, which receives it and acts on it exactly as if it were sent by the normal or "primary" pointer.

More specifically, from the structural viewpoint, the secondary pointer (which will be called hereinafter "secondary mouse", since the invention will be described with particular reference to the mouse as a pointer, though this involves no limitation) comprises a transceiver coupled with a decoder/encoder, at least one memory, generally comprising a plurality of memory addresses, an embedded controller, and hand-operable actuation means, such as buttons or keys—hereinafter the R or T keys, or, alternatively, a single R/T key—for placing the device in the R or T mode. In order to be able to register a plurality of different commands or series of commands (hereinafter, "programs"), the secondary pointer is also preferably provided with a selector, which attributes an identification to each command or program in the R mode and uses said identification to retrieve the program which the operator desires, when the device is placed in the T mode. When the secondary pointer is so provided, it is preferably also provided with a plurality of memories or memory addresses to which the received information is transmitted and from which it is received, as directed by the selector. The embedded controller will of course control all the aforesaid operations.

When a Bluetooth device is used, said device already comprises a transceiver and a decoder/encoder, as a unit.

In operation, the device can be started by depressing a dedicated key. The mode will be selected by depressing the R or the T key. One of said keys, or both of them, can also be used as dedicated keys for starting and/or stopping the device. If the R key is depressed, the embedded controller will direct the transceiver to act as a receiver, send the received information to the decoder to transform it from analog to digital information, and send the analog information, resulting from the decoding, to the memory or memory address which has been selected by the selector. The secondary pointer will continue to operate in the R mode until it is either stopped by depressing the appropriate dedicated key, or directed to pass into the T mode by depressing the T key. When the device is in the T mode, the embedded controller will cause digital information to be retrieved from the memory address which has been selected by the selector, the encoder/decoder to act and a decoder and transform the retrieved digital information into analog information, and the receiver to act as a transmitter and to transmit the analog information resulting from the encoding. The device can also be passed from the R to the T mode by stopping it, restarting it, and then pressing the T key (which, as has been said, can also be used to start the device). This will typically occur if significant time passes between the reception and the transmission of information. Various combination of keys can easily be designed by skilled persons, and, of course, actuating means different from keys can be provided. If a single R/T key is provided, it can be controlled to place the device in the R or T mode and to start it or stop it, in manners obvious to skilled persons.

It is appreciated that the secondary mouse must be able to receive information from the normal or primary mouse, but not to send information to it—even though sending information may cause no harm, since it is possible that the primary mouse is not provided with a memory and will not retain whatever information it receives. On the other hand, the secondary mouse must be able to send information to the computer, but not to receive information from the computer. All this is very easily arranged, since normally a Bluetooth device of a primary mouse will not act as a transceiver but only as a transmitter, and a Bluetooth device of a computer will not act as a transceiver but only as a receiver. This may be obtained either by the structure of the Bluetooth devices or by the protocol which controls them.

On the other hand, it should be considered that the ordinary Bluetooth devices have a range of a few meters and therefore in a crowded office interference may arise between different secondary pointers based on Bluetooth devices. This can be obviated by reducing the range of the Bluetooth transceiver of the secondary mouse to two meters or even one meter or less, and anyway to a range short enough to prevent interference with the nearest secondary mouse devices, and the operator will see to it that the secondary mouse is located at an appropriate distance from the corresponding primary mouse and computer. Alternatively, different Bluetooth devices may operate on different wavelengths.

DETAILED DESCRIPTION OF PREFERRED EMBODIMENTS

Figure 1:
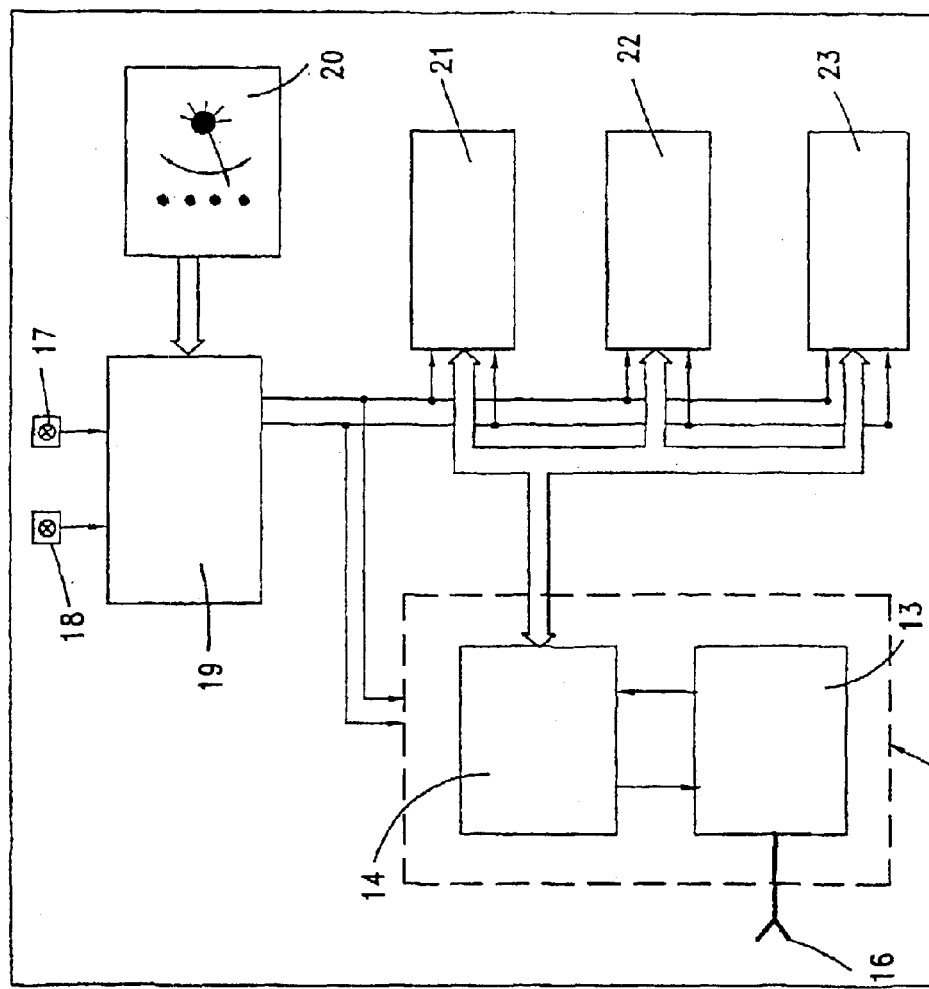
FIG. 1 is a schematic diagram of an secondary mouse according to an embodiment of the invention.
Figure 1:
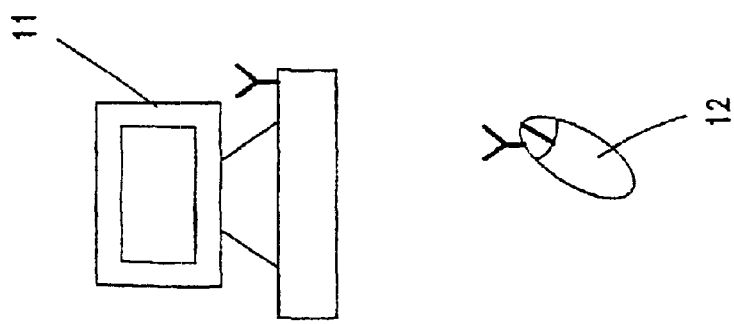

In FIG. 1, the secondary mouse is generally indicated at 10. A computer is generally indicated at 11 and a primary mouse is schematically indicated at 12. The secondary mouse 10 comprises a transceiver 13 and a decoder/encoder 14, which, in this preferred embodiment, are a part of a Bluetooth device generally indicated at 15. As schematically indicated at 16, the transceiver receives information from the primary mouse and transmits information to the computer. 17 indicates a R key and 18 indicates a T key. 19 indicates an embedded controller, and 20 schematically indicates a selector.

When the primary mouse transmits, and the operator wishes the information, which said mouse transmits to the computer, to be stored for future repetition, the R key is depressed. The embedded controller directs the transceiver to operate as a receiver and the decoder/encoder to operate as a decoder, and the decoded information is sent to one of a plurality of memories or memory addresses, indicated in the drawing as three purely for illustrative purposes, and designated by numerals 21, 22 and 23. Before sending of the information from the decoder to a memory or memory address, an identification symbol, generally a number, is sent by the selector and is registered in the memory. When the recording should be stopped, the R key is pressed once again. When the information stored is to be retransmitted to the computer, the T key is depressed. Obviously, if the T key is depressed when the secondary mouse is in the record mode, it will stop the recording and change mode. When the T key is depressed, the embedded controller directs the transceiver to act as a transmitter and the decoder/encoder to act as an encoder, and directs the information contained in one of the memories or memory addresses and selected by the selector to be encoded and the encoded information to be sent to the transceiver and to be transmitted by it. Generally, a small number of different pointer outputs or series of pointer outputs will be required to be stored, for instance up to ten, and therefore they will be identified each by a numeral from 0 to 9. If a memory or memory address is full, the secondary mouse will record in overwrite mode and the old information will be canceled as far as necessary to permit the new information to be memorized.

Figure 2:
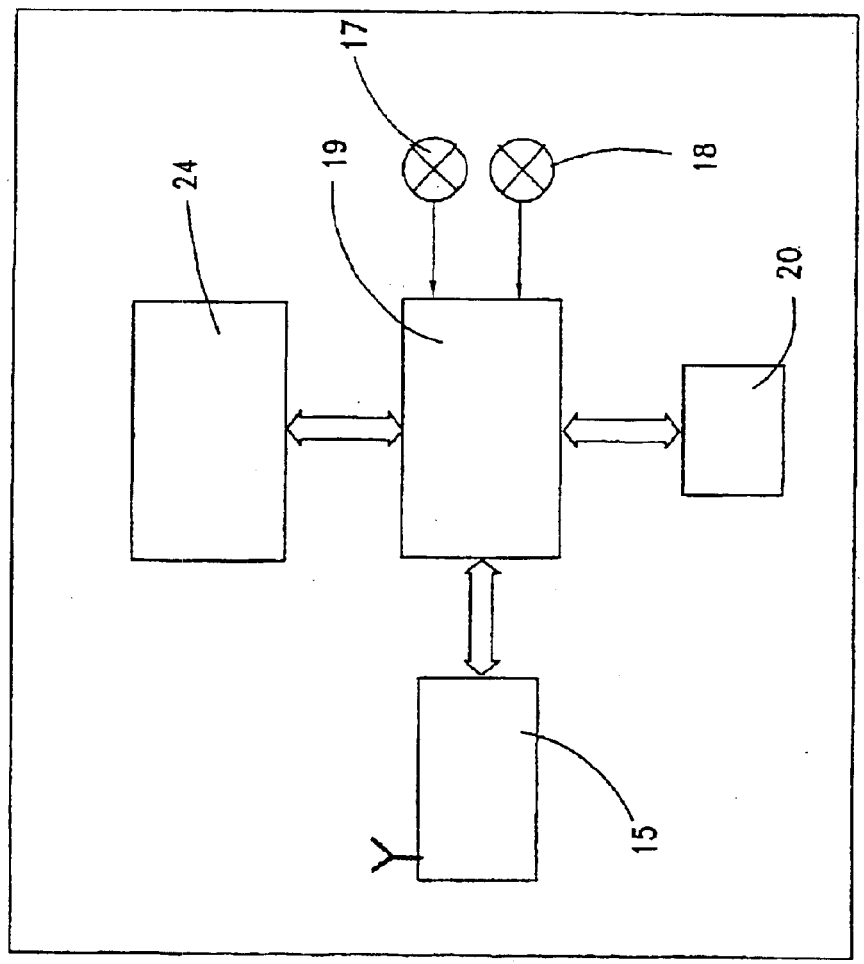
FIG. 2 is a similar diagram of a simplified embodiment of the invention.
Figure 2:
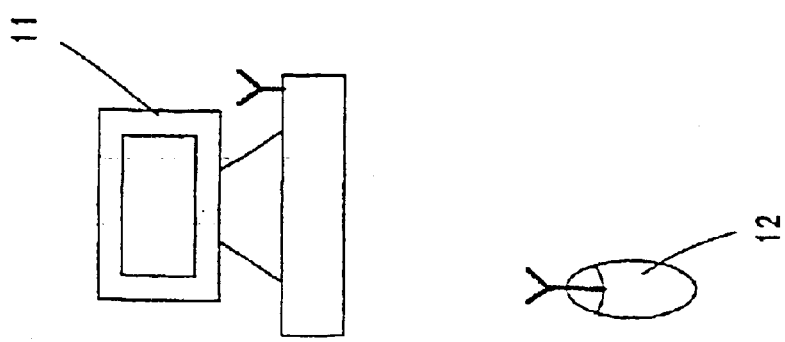

In FIG. 2, an embodiment is illustrated which is analogous to that of FIG. 1, the corresponding parts being indicated by the same numerals. However, a single memory 24 is shown.

Figure 3:
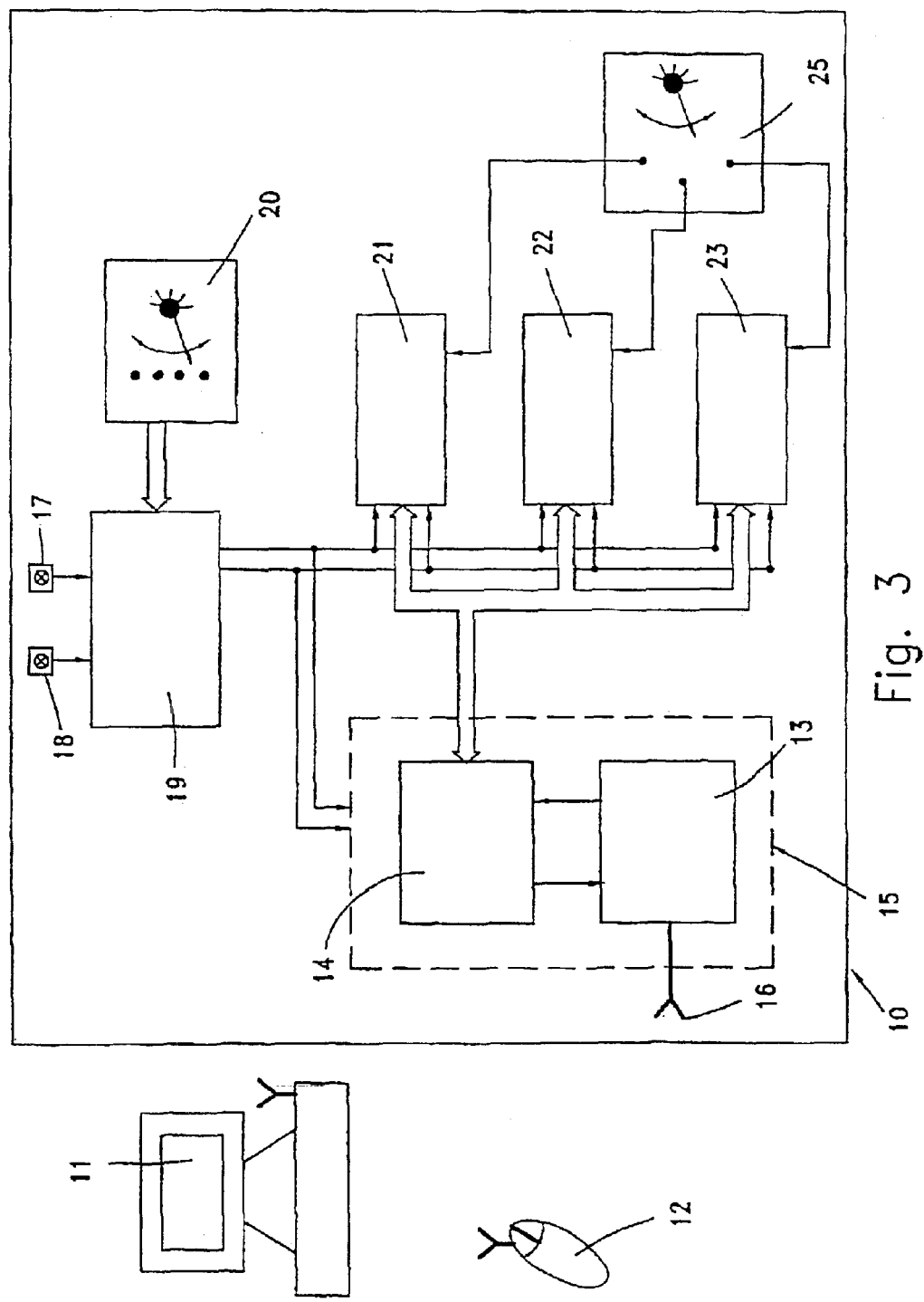
FIG. 3 is a diagram of a more complex embodiment of the secondary mouse according to the invention.

In FIG. 3, a more complex secondary mouse is shown, which is adapted for transmitting from the computer information that has been stored in past operation periods of the computer. If the secondary mouse has been used to record for a certain time and then the computer is shut down, it may be that when it is switched on once again, particularly if a significant period of time has elapsed, the computer will be operating according to a different program or for an entirely different application: e.g., it may be that it had been used once as a word processor and later on to produce drawings, or vice versa, or that the program has been changed for any other reason. In this case, it is desirable to provide a plurality of memories or memory addresses and to reserve each one for a different program or application. If this is the case, the secondary mouse will be provided with an program or "application selector" 25, which will be actuated by the embedded controller to direct to the appropriate memory or address the information received and to retrieve from the appropriate memory or address the information to be transmitted to the computer. Any structure of switching device may be adopted for the application selector, and skilled persons will have no difficulty in choosing an appropriate one.

It will be apparent that a secondary mouse according to the embodiments described need not be larger and may be smaller than a conventional mouse, and may be quite inexpensive, at least if a Bluetooth device is used to provide a transceiver and a decoder/encoder. The invention is certainly applicable, however, to different radio transceivers or to transceivers which use a different kind of radiation, such as infrared. However, in these cases, the secondary mouse will be more expensive and less convenient than a mouse based on a Bluetooth device.

As stated hereinbefore, the references to a mouse are not intended as a limitation and what is said herein as to mouse devices equally applies to any pointer.

While embodiments of the invention have been described by way of illustration, it will be apparent that the invention can be carried out with many modifications, variations and adaptations, without exceeding the scope of the claims.

What is claimed is:

1. The combination of a computer adapted to receive via radiation analog control signals; a single input pointer adapted to transmit via radiation analog signals for controlling the computer; and a device for controlling the computer, having a receiving mode in which the device simultaneously receives via radiation the same analog signals being transmitted by the pointer to the computer, and a transmitting mode in which the device transmits said same analog signals, upon demand, to the computer; said device comprising a transceiver coupled with a decoder/encoder to transform received analog signals into corresponding digital signals and to transform corresponding digital signals into analog signals for transmitting to the computer, a plurality of memory addresses for storing the corresponding digital signals, an embedded controller coupling and controlling the decoder/encoder with the memory addresses, and a manually-operable actuator for manually selectively placing the device in one of the receiving mode and the transmitting mode.

2. The combination according to claim 1, wherein the manual actuator is one of a key and a button.

3. The combination according to claim 1, wherein the device further includes a selector which attributes an identification to each command or program in the receiving mode, and uses said identification to retrieve the command or program when the device is in the transmitting mode.

4. The combination according to claim 1, wherein the device includes a plurality of memories, each having at least one memory address.

5. The combination according to claim 1, wherein the transceiver is a Bluetooth device.

6. The combination according to claim 1, wherein the transceiver and the decoder/encoder together constitute a unit of the Bluetooth type.

7. The combination according to claim 1, wherein the transceiver is an infrared device.

8. The combination according to claim 1, wherein the device further includes a protocol controller that enables the device to receive information from the single input pointer, but prohibits information being sent to the single input pointer, and enables information being sent to the computer, but prohibits information being received from the computer.

9. The combination according to claim 1, wherein the device further comprises a plurality of memories, each dedicated to a different application, and an application selector for directing to the appropriate memory the analog signals received by the transceiver and being sent via the encoder/decoder to the memory and for retrieving from the appropriate memory the corresponding digital signals to be sent via the encoder/decoder to the transceiver for transmission to the computer.

10. Method of operating the combination according to claim 1, which comprises the steps of:
  A) placing the device in the receiving mode,
  B) selecting a memory address,
  C) causing the embedded controller to direct the transceiver to act as a receiver, to send the received information to the a encoder/decoder to transform into digital information and send the transformed information to the selected memory address,
  D) continuing to operate in the receiving mode until it is stopped, E) when it is desired to send information to the computer, placing the device into the transmitting mode, F) selecting a memory address, G) retrieving digital information from said memory address, H) transforming the retrieved information into analog information, and I) transmitting the retrieved information to a computer.

11. A device for controlling a computer, having a receiving mode in which the device simultaneously receives via radiation the same analog signals being transmitted by a pointer to a computer, and a transmitting mode in which the device transmits said same analog signals, upon demand, to the computer, said device comprising a transceiver coupled with a decoder/encoder to transform received analog signals into corresponding digital signals and to transform corresponding digital signals into analog signals for transmitting to the computer, a plurality of memory addresses for storing the transformed digital signals, an embedded controller coupling and controlling the decoder/encoder with the memory addresses, and a manually-operable actuator for manually selectively placing the device in one of the receiving mode and the transmitting mode.

12. Device according to claim 11, wherein the manually-operable actuator is one of a key and a button.

13. Device according to claim 11, further comprising a selector that attributes en identification to each command or program in the receiving mode, and uses said identification to retrieve the program which the operator desires when the device is placed in the transmitting mode.

14. Device according to claim 11, comprising a plurality of memories or memory addresses to which the received information is transmitted and from which it is received, as directed by the selector.

15. Device according to claim 11, wherein the transceiver is one of a Bluetooth device and an infrared device.

16. Device according to claim 11, wherein the transceiver and the decoder/encoder together constitute a unit of the Bluetooth type.

17. Device according to claim 11, including a protocol controller that enables information to be received from the pointer, and inhibits sending information to the pointer, and enables information to be sent to the computer, and inhibits information being received from the computer.

18. Device according to claim 11, further comprises a plurality of memories, dedicated to different applications, and an application selector for directing to the appropriate memory the information received from the pointer and for retrieving from the appropriate memory the information to be transmitted to the computer.

* * * * *